US010962672B2

(12) United States Patent
Chia

(10) Patent No.: US 10,962,672 B2
(45) Date of Patent: Mar. 30, 2021

(54) DUAL MODE ELECTROMAGNETIC IMAGING OF A BOREHOLE

(71) Applicant: Halliburton Energy Services, Inc., Houston, TX (US)

(72) Inventor: Yan Wah Michael Chia, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 248 days.

(21) Appl. No.: 16/075,079

(22) PCT Filed: Apr. 22, 2016

(86) PCT No.: PCT/US2016/028863
§ 371 (c)(1),
(2) Date: Aug. 2, 2018

(87) PCT Pub. No.: WO2017/184164
PCT Pub. Date: Oct. 26, 2017

(65) Prior Publication Data
US 2019/0041540 A1    Feb. 7, 2019

(51) Int. Cl.
*G01V 3/20* (2006.01)
*G01V 3/30* (2006.01)
*E21B 17/00* (2006.01)
*E21B 49/00* (2006.01)
*G01V 3/38* (2006.01)

(52) U.S. Cl.
CPC .............. *G01V 3/20* (2013.01); *E21B 17/003* (2013.01); *E21B 49/005* (2013.01); *G01V 3/30* (2013.01); *G01V 3/38* (2013.01)

(58) Field of Classification Search
CPC ..... G01V 3/20; G01V 3/30; G01V 3/38; E21B 49/005; E21B 17/003
See application file for complete search history.

(56) References Cited

U.S. PATENT DOCUMENTS

| 5,200,705 A | 4/1993 | Clark et al. |
| 5,523,758 A | 6/1996 | Harmuth |
| 5,574,371 A | 11/1996 | Tabanou et al. |

(Continued)

FOREIGN PATENT DOCUMENTS

WO    2015126365 A1    8/2015

OTHER PUBLICATIONS

Grayson et al., NMR-Enhanced Natural Fracture Evaluation in the Monterey Shale, Jul. 18-22, 2015, SPWLA 56th Annual Logging Symposium, 11 pp. (Year: 2015).*

(Continued)

*Primary Examiner* — Toan M Le
(74) *Attorney, Agent, or Firm* — Gilliam IP PLLC

(57) ABSTRACT

A method for performing dual mode imaging of a borehole determines a reference point in a geological formation in response to a resistivity measurement of the formation. The reference point is associated with a feature, such as a fracture, in the formation. A tilt angle of the feature is determined, with respect to the reference point, in response to the received electromagnetic signals from the formation. For example a time-of-flight, ranging operation may be performed or an attenuation and phase change of the received signals may be determined to image the feature.

20 Claims, 14 Drawing Sheets

FRONT VIEW

SIDE VIEW

(56) References Cited

U.S. PATENT DOCUMENTS

| | | | |
|---|---|---|---|
| 6,924,646 | B2 | 8/2005 | Omeragic |
| 7,082,993 | B2 | 8/2006 | Ayoub et al. |
| 7,394,258 | B2 | 7/2008 | Itskovich et al. |
| 7,928,733 | B2 | 4/2011 | Gorek et al. |
| 7,959,094 | B2 | 6/2011 | Moeny |
| 8,096,355 | B2 | 1/2012 | McDaniel et al. |
| 8,776,878 | B2 | 7/2014 | Bloemenkamp et al. |
| 8,901,932 | B2 | 12/2014 | Hayman |
| 2009/0277630 | A1 | 11/2009 | McDaniel et al. |
| 2011/0204897 | A1* | 8/2011 | Hu .......... G01V 3/24 324/351 |
| 2011/0221443 | A1 | 9/2011 | Bittar et al. |
| 2012/0065889 | A1 | 3/2012 | Wu et al. |
| 2012/0293179 | A1 | 11/2012 | Colombo et al. |
| 2014/0032116 | A1 | 1/2014 | Guner et al. |
| 2019/0271793 | A1 | 9/2019 | Wilson et al. |

OTHER PUBLICATIONS

CA Application Serial No. 3,017,110, Office Action, dated Jun. 18, 2019, 4 pages.

PCT Application Serial No. PCT/US2016/028863, International Preliminary Report on Patentability, dated Oct. 23, 2018, 8 pages.

EP Application Serial No. EP 16899655.1; Extended European Search Report; dated Sep. 20, 2019, 9 pages.

Lesmes, et al., "A multiscale radar-stratigraphic analysis of fluvial aquifer heterogeneity", Geophysics, vol. 67, No. 5 (Sep.-Oct. 2002); p. 1452-1464, 10 Figs., 4 Tables. 10.1190/1.1512745, Sep. 1, 2002, pp. 1452-1464.

PCT Application Serial No. PCT/US2016/028863, International Search Report, dated Jan. 18, 2017, 4 pages.

PCT Application Serial No. PCT/US2016/028863, International Written Opinion, dated Jan. 18, 2017, 7 pages.

Bittar, et al., "A Modern Microwave Formation Evaluation Sensor and Its Applications in Reservoir Evaluation", Society of Petrophysicists and Well-Log Analysts, SPWLA 51st Annual Logging Symposium, Jun. 19-23, 2010, Perth, Australia, 2010, 10 pages.

Bloemenkamp, et al., "Design and Field Testing of a New High-Definition Microresistivity Imaging Tool Engineered for Oil-Based Mud", Society of Petrophysicists and Well-Log Analysts, SPWLA 55th Annual Logging Symposium, May 18-22, 2014, Abu Dhabi, United Arab Emirates, 2014, 25 pages.

Croswell, et al., "Slot Antennas", Antenna Engineering Handbook, 3rd edition, Chapter 8, 1993, 21 pages.

Ellis, et al., "Well Logging for Earth Scientist", Springer, 2nd Edition, 2007, 699 pages.

Itskovich, et al., "An Improved Resistivity Imager for Oil-Based Mud: Basic Physics and Applications", Society of Petrophysicists and Well-Log Analysts, SPWLA 55th Annual Logging Symposium, May 18-22, 2014, Abu Dhabi, United Arab Emirates, 2014, 13 pages.

Martel, "Analysis of Fracture Orientation Data from Boreholes", Environmental and Engineering Geoscience, 1999, vol. 5, No. 2, 1999, pp. 213-233.

Rappaport, "Wireless Communication", Prentice-Hall, Inc., Prentice Hall Communications Engineering and Emerging Technologies Series, 1996, 652 pages.

* cited by examiner

|  | MODE 1 | MODE 2A | MODE 2B |
|---|---|---|---|
| RESOLUTION AND FUNCTION | HIGH RESOLUTION IMAGING (6MM TO 26MM DEPENDING ON TYPICAL BUTTON SIZE AND GUARD). | LOW RANGING RESOLUTION (TYPICAL 0.1M TO 0.6M DEPENDING ON THE OPERATING FREQUENCIES BELOW 2 GHZ). MEASURE TILT ANGLE WHEN COMBINED WITH MODE 1 | LOW RESOLUTION (A FEW TENS OF MILLIMETERS) MEASURE TILT ANGLE WHEN COMBINED WITH MODE 1 |
| STANDOFF | SHORT DISTANCE 2.5MM TO 26MM (ASSUMING 26MM BUTTON). OPERATE IN OIL AND WATER BASED MUD | LONG DISTANCE 0.15M TO SEVERAL METERS OPERATE IN OIL AND WATER BASED MUD | MEDIUM DISTANCE SEVERAL TENS OF MILLIMETERS OIL AND WATER BASED MUD ENVIRONMENT |

Fig. 10A

DUAL MODE ELECTROMAGNETIC IMAGING OF A BOREHOLE

BACKGROUND

Electromagnetic resistivity sensors are used in borehole drilling to image formation properties. Such sensors include small button electrodes that focus a current into the formation and, using Galvanic measurement principles (e.g., Ohm's law), image the surrounding formation based on received signals. Analysis of fracture orientation data from boreholes has determined that the boreholes may introduce an observational bias into the collected data such that formation fractures at small angles to the borehole are under-represented in the data. Accounting for such formation fractures may be important in evaluating the geology, mechanics, or hydraulics of a subsurface rock mass.

BRIEF DESCRIPTION OF THE DRAWINGS

FIGS. 10A and 10B are a table showing a comparison of various operational mode characteristics, according to various examples of the disclosure.

DETAILED DESCRIPTION

Some of the challenges noted above, as well as others, can be addressed by using multiple modes operating on the same electromagnetic (EM) aperture (i.e., electrode or antenna). One mode (i.e., Mode 1 using electrode) is based on resistivity imaging using Ohm's law to determine a two-dimensional (2D) feature (e.g., fracture) reference point. A second mode (i.e., Mode 2 using antenna) is based on a propagation measurement principle (e.g., time-of-flight) to detect the orientation of the geological formation features with respect to the 2D fracture reference point.

Figure 1:
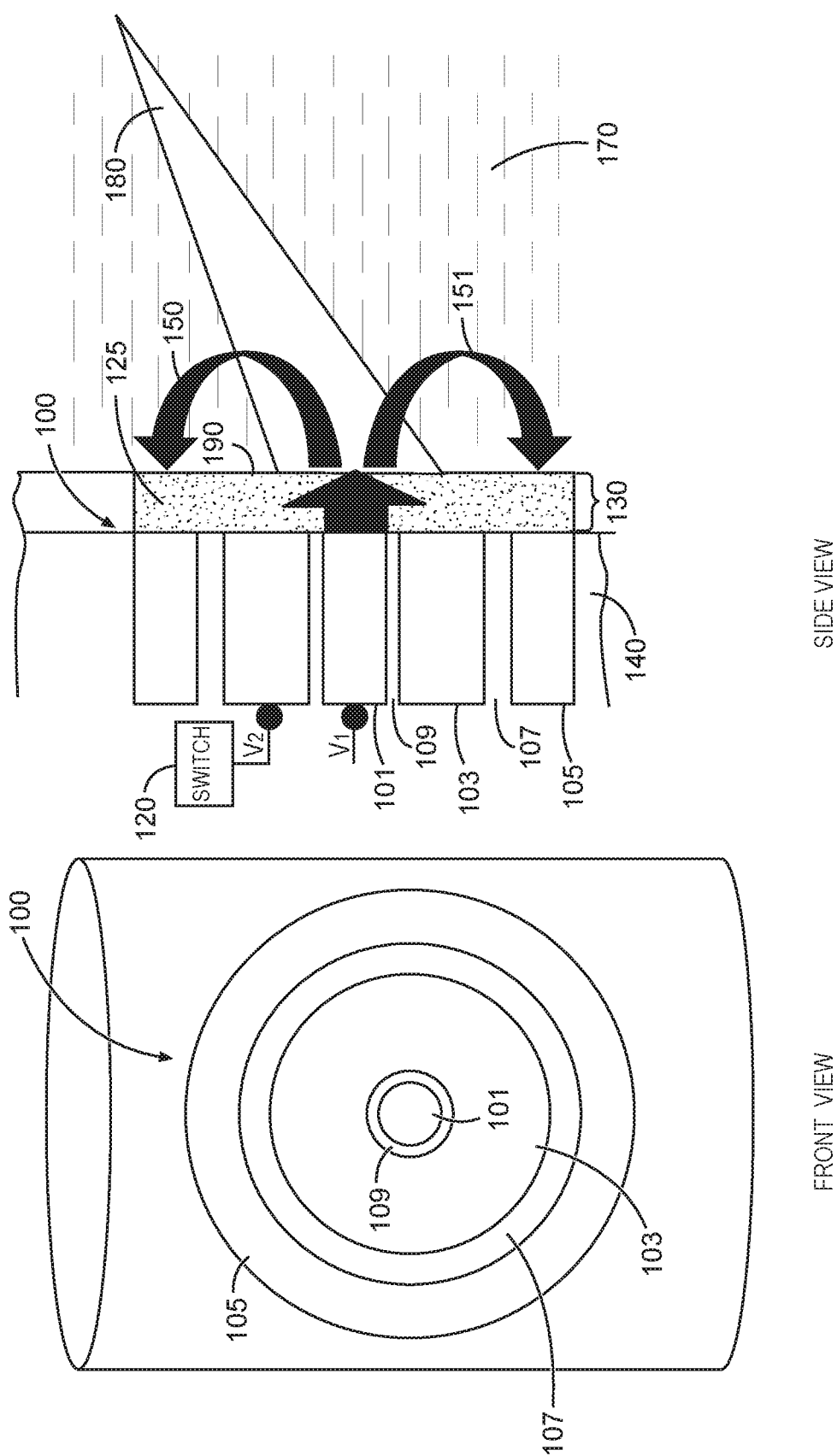
FIG. 1 is a diagram showing a front and side view of a button electrode structure to measure formation resistivity in a first operational mode, according to various examples of the disclosure.

FIG. 1 is a diagram showing a front and side view of a button electrode structure 100 to measure formation resistivity in a first operational mode, according to various examples of the disclosure. The electrode structure 100 shown is for purposes of illustration as other electrode structures may be used.

The electrode structure 100 may be coupled to an imaging tool housing 140 (i.e., tool body). An outer surface of the electrode structure 100 may be substantially flush with an outer surface of the tool housing 140 or it may protrude from the housing surface. As used herein, the electrode structure 100 being coupled to the tool housing 140 may be defined as the electrode structure 100 being integral with the tool body outer structure or coupled to an exterior surface of the tool body structure.

The electrode structure 100 comprises a center conductor 101 (i.e., button) that is the primary focus electrode. An outer annular conductor 103, subsequently referred to as a guard conductor, substantially surrounds the center conductor 101. The center conductor 101 is electrically isolated from the guard conductor 103 by an inner annular dielectric material 109 (i.e., inner dielectric). The inner dielectric 109 may be ceramic or some other insulating material that can withstand the downhole environment.

The electrode structure comprising the center and guard conductors 101, 103 separated by the inner annular dielectric 109 is separated from the tool body 140 by an outer annular dielectric material 107. The outer annular dielectric material 107 may be the same material as the inner dielectric 109 (e.g., ceramic).

An outer annular conductor 105 is shown in FIG. 1 surrounding the electrode structure of the center and guard conductors 101, 103 and inner and outer annular dielectrics 109, 107. This structure 105 may be an integral portion of the tool body 140 or a separate conductor coupled to the tool body 140 and separated from the guard conductor 103 by the outer annular dielectric 107.

As will be seen later, the center conductor 101 and guard conductor 103 are shared between the first mode (i.e., Mode 1, button and guard electrode mode) and the second mode (i.e., Mode 2, annular slot antenna mode). A switch 120 is coupled to the guard conductor 103 to control the guard potential in the second mode. The switch 120 is configured to couple a first voltage to the guard conductor 103 during the first mode of operation and a second voltage to the outer conductor 103 during the second mode of operation.

The side view of the electrode structure 100 is shown in a borehole in a geological formation 170 with a layer of fluid (e.g., drilling mud) 125 between the tool body 140 and the borehole wall 190. The mud thickness 130 may be in a range of 1 to 25 millimeters (mm) and may also be referred to as a stand-off distance of the tool from the borehole wall. A typical stand-off distance may be proportional to a diameter of the center conductor 101 (i.e., button electrode).

In the first mode operation, a first voltage $V_1$ is applied to the center conductor 101. A second voltage $V_2$ is applied to the guard conductor 103. In an example, $V_1=V_2$ Volts. These voltages may be in a range of milliVolts (mV) to tens of Volts. Other examples may use different voltages.

By controlling the potential difference ($\Delta V$) between the center conductor 101 and the guard conductor 103, the emanating electric field can be focused so as to be concentrated in the immediate vicinity of the center conductor 101. The side view of FIG. 1 shows the current flow 150, 151 from the center conductor 101 and returning to the tool body 140. Depending on the voltage used, the depth of geological formation investigation may be in the tens to hundreds of millimeters.

The apparent resistivity of the formation immediately adjacent to the borehole wall 190 may be determined by $R_a=K(V/I)$ where K is a geometric factor or constant, V is the magnitude of the power source, and I is the current flow as measured from the center electrode 101.

For oil-based mud, impedance processing may be performed at multi-MHz frequencies to obtain the true resistivity of the formation and reduce oil-based mud effects. For relatively higher frequencies (e.g., greater than MHz frequencies), the mud resistivity may be reduced since the dominant coupling is capacitive. For most resistivity imaging, it may be assumed that the oil-based mud effect is ignored at frequencies above MHz frequencies and the real part of the apparent resistivity represents the formation resistivity since the real component of the mud impedance is proportional to the stand-off distance (i.e., the thickness of the mud layer). In general, the apparent resistivity is a function of frequency, conductivity/resistivity, and dielectric constant of the formation after removing the oil-based mud effects.

Detected changes in resistivity of the formation may then be used to image the adjacent formation 170. For example, during a logging operation, the detected resistivity may remain relatively constant until a relatively large apparent resistivity is noted. This spike in resistivity from the relatively constant resistivity may indicate a fracture 180 in the formation. The location of this fracture is then noted to be used in the second mode of the operation.

Figure 2:
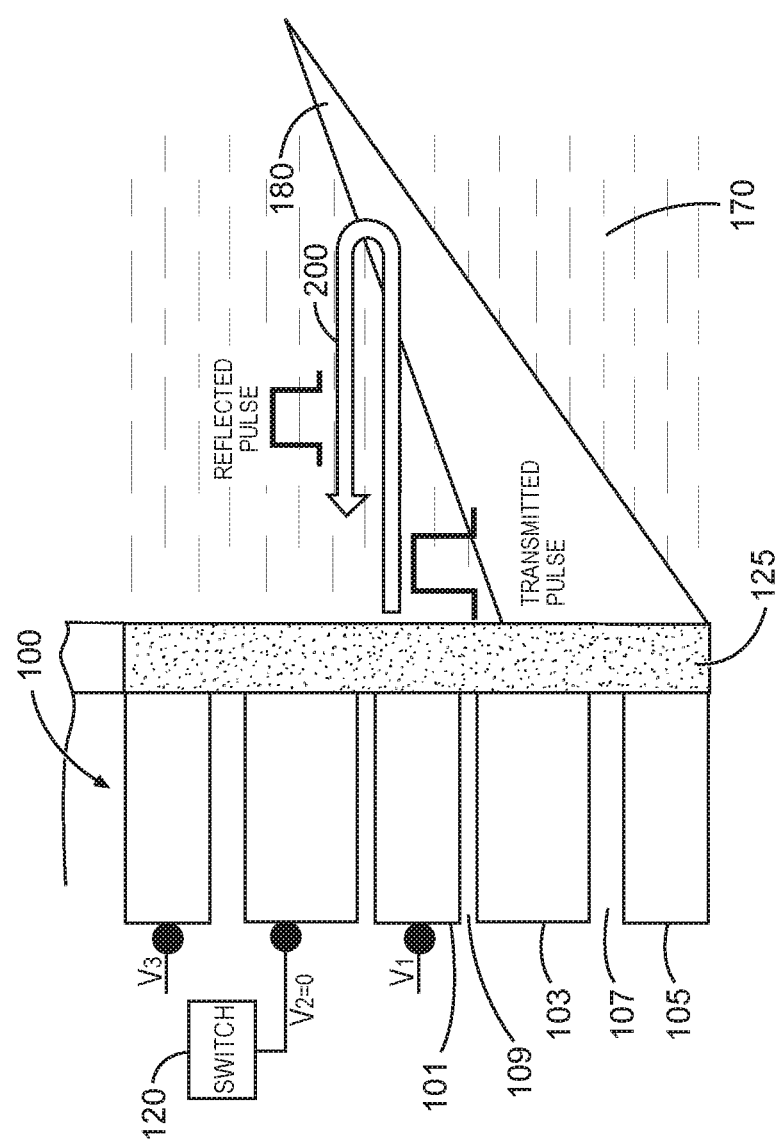
FIG. 2 is a diagram showing a side view of the button electrode structure that is excited as an antenna to transmit and detect time-of-flight of electromagnetic pulses in a second operational mode, according to various examples of the disclosure.

FIG. 2 is a diagram showing a side view of the button electrode structure that is excited as an antenna to transmit and detect time-of-flight of electromagnetic pulses in a second operational mode, according to various examples of the disclosure. The second mode thus uses the same electrode structure 100 of FIG. 1 but, instead of being used as a resistivity measurement electrode, the electrode structure 100 is now used as an annular slot loop antenna to perform a ranging function. The combination of annular slot antenna with button and guard electrode may provide a compact form factor for dual mode detection and imaging. The second mode of the EM aperture may operate at a relatively higher frequency (above MHz) as an antenna.

The ranging function is based on a reference point of the fracture 180 (e.g., one end of the fracture 180 in proximity to the electrode) as determined in the first mode. Since the location of the fracture is known, the time-of-flight ranging function measures the tilt angle of the fracture 180 by measuring the distance of various portions of the fracture 180 from the tool as the tool moves through the borehole.

The embodiments exploit the single EM aperture (i.e., substantially cylindrical conductor structures including the button 101 and guard 103) to form an annular slot antenna for the receiver. However, the outer conductor 103, that formerly acted as the guard conductor 103 in the first mode, is not at the same voltage as the center conductor 101 in the second mode. Instead, the switch 120 connects the outer conductor 103 to approximately AC ground ($V_2=0V$) when it is desired to excite the outer conductor 103 to act as the annular slot loop antenna. The annular slot antenna is excited by the coaxial feed on the center conductor 101. The coaxial feed may be a plurality of pulses represented by $V_1$ on the center conductor 101.

The annular slot loop antenna 100 is essentially a magnetic current loop source fed by a Transverse EM (TEM) coaxial mode. At frequencies higher than MHz frequencies, with the tool body 140 acting as a large ground plane, sufficient radiation directivity may be provided. Also, unlike conventional slot loop antennas, the electrode structure 100 may have the advantage of being substantially flush to the tool body to provide a compact form factor.

In operation of the second mode, the center conductor 101 transmits a plurality of pulses 200 into the formation 170. The pulses may be transmitted at frequencies greater than 100 MHz. The pulses will be reflected back by the fracture 180 to be received by the outer conductor 103 of the antenna 100. Since the time of transmission of each pulse is known, the time that it takes for the pulse to travel to the fracture 180, be reflected back to the tool by the fracture 180, and received by the outer conductor 103 of the antenna 100 may be measured (i.e., time-of-flight). Time-of-Fight ranging may be defined as frequency modulated continuous wave, short pulse with pulse repetition, or pseudo-random pulse without a carrier signal (i.e., spread spectrum ranging). These ranging methods are described subsequently in greater detail.

If the fracture 180 is tilted, the time-of-flight will change as the tool is moved through the borehole. For example, as shown in FIG. 2, as the tool is moved upwards from the bottom of the figure (i.e., lower in the borehole) to the top of the figure (i.e., higher in the borehole), the distance between tool and the fracture will increase since the fracture 180 tilts outward away from the borehole. The increasing distance is indicated by an increasing time-of-flight of the pulses as the tool moves.

In some embodiments, it may be desirable to align a phase center of a transmitting antenna with the center conductor of a receiving antenna. In one example, this may be implemented between the tool body and outer conductor 103 of the electrode structure 10) of FIGS. 1-3. In another example, this may be implemented using another larger annular loop that may be added to form concentric annular loops. Such examples are illustrated in FIGS. 4-7 as described subsequently.

Figure 3:
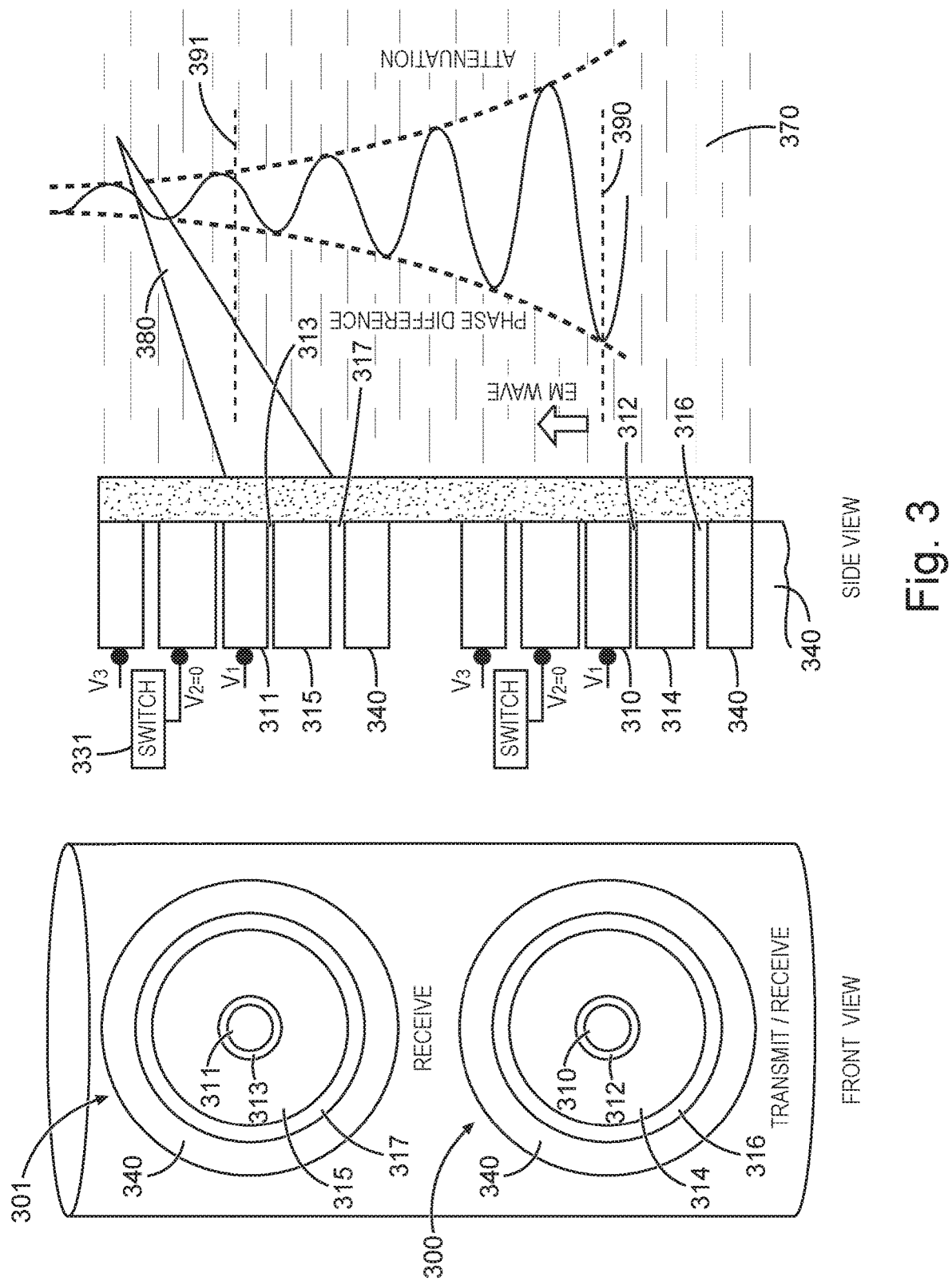
FIG. 3 is a diagram showing a front and side view of the button electrode structure to measure propagation-attenuation and phase of electromagnetic pulses in the second operational mode, according to various examples of the disclosure.

FIG. 3 is a diagram showing a front and side view of the button electrode structure to measure propagation-attenuation and phase of electromagnetic pulses in the second operational mode, according to various examples of the disclosure. This example uses a first electrode structure 300 as a transmit and receive antenna while a second electrode structure 301 is used as a receive antenna. Both electrode structures 300, 301 may be used as both button electrode/guard (Mode 1) and annular slot antenna (Mode 2).

Substantially similar to the previous examples, the first and second electrode structures 300, 301 include a center conductor 310, 311 and an outer conductor 314, 315 separated from its respective center conductor 310, 311 by a respective inner annular dielectric 312, 313. The outer conductor 314, 315 is separated from the tool body 340, or another conductor coupled to or as part of the tool body 340, by an outer annular dielectric 316, 317.

A switch 330, 331 is coupled to their respective outer conductors 314, 315 in order to switch a $V_2$ potential (e.g., 0V) during the second mode. As in the previous examples, $V_1=V_2$ during the first mode. The $V_1/V_2$ voltages may be in a range of mV to tens of Volts during the first mode.

The first mode of operation for determining a location of the fracture 380 in the formation 370 is substantially the same as previously described with reference to FIGS. 1 and 2 with the addition of a second electrode structure 301. For example, a first voltage $V_1$ is applied to the center conductors 310, 311 of the first and second electrode structures 300, 301. A second voltage $V_2$ is applied to the guard conductors 314, 315 of the first and second electrode structures 300, 301. In an embodiment, $V_1=V_2$ Volts. Other embodiments may use different voltages.

By controlling the potential (ΔV) between the center conductors 310, 311 and the guard conductors 314, 315, the emanating electric fields can be focused so as to be concentrated in the immediate vicinity of the center conductors 310, 311.

In the second mode of operation, one of the electrode structures (e.g., first electrode structure 300) acts as a transmit/receive annular slot antenna 300 while the other electrode structure (e.g., second electrode structure 301) acts as a receive annular slot antenna 301. In this mode, the switches 330, 331 switch a reference voltage (e.g., 0V) to their respective outer conductors 314, 315.

As an example of operation shown in FIG. 3, the transmitting annular slot antenna 300 transmits an electromagnetic (EM) wave into the formation 370. As the EM wave propagates upwards through the formation 370, the amplitude and phase change. For example, the amplitude of the signal is attenuated by the formation and its phase is shifted so that, at the launch point 390 of the signal, the signal amplitude is greater than at the reception point 391 of the signal by the receiving annular slot antenna 301. The phase of the signal at the launch point 390 and reception point 391 is also shown being different. These signal changes may then be used, as discussed subsequently, to determine the tilt angle of the fracture 380 in the formation 370 relative to the tool body 340.

The various propagation modes described subsequently to measure the tilt angle of the fracture 380 may be performed by any of the above-described example electrode structures, either single or dual annular slot antenna structures. Different propagation modes may be used with the annular slot antenna structures with operating frequencies above 100 MHz (e.g., higher than first mode frequency of less than 100 MHz) depending on the desired detection range. These propagation modes may be considered to be sub-modes of the second mode (Mode 2) and will subsequently be referred to as Mode 2A and Mode 2B. For example, Mode 2A uses propagation with measured ranging and detection for relatively long range detection. Mode 2B uses propagation with measured attenuation and phase for medium range detection (e.g., distances less than long range but greater than the range provided by the Galvanic methods used in FIG. 1). Reference to Mode 2 includes reference to any sub-modes (e.g., Mode 2A and 2B).

In Mode 2A (e.g., ranging mode), the measurement principle of ranging radiates a pulse-like EM wave (e.g., RF signal or Sweeping Continuous Wave) to measure the time-of-flight of the return signal using a ranging or radar principle. The time-of-flight provides the ability to measure the distance of the EM reflection due to the tilt angle. In the ranging mode, the annular slot antenna tends to radiate at higher MHz frequency (e.g. >100) MHz), hence it can operate at longer distances by transmitting RF signals into the formation and measuring the time-of-flight of reflected signals to compute the range as discussed previously.

The ranging transceiver of Mode 2A can operate using a frequency modulated continuous wave technique, a short pulse with pulse repetition technique, or a pseudo random pulse without carrier signal technique.

The frequency modulated continuous wave technique includes a periodic continuous wave with a continuously varying frequency (e.g., from low to high frequency). For example, the frequency may vary between 10 MHz and 1 GHz. Ranging resolution is measured by a frequency difference due to a delay between the transmitted signal and the reflected signal with respect to time (reflected by the formation fracture). In an example, the two antenna configuration of FIG. 3 may be used. Another example may use only one antenna as illustrated in FIGS. 1 and 2.

The short pulse with pulse repetition technique transmits relatively short EM pulses (e.g., measured in nanoseconds) that are modulated on an RF carrier and are sent periodically to interrogate a target fracture. The time-of-flight of the signals is measured in response to the time difference between the transmitted signals and the corresponding reflected signals that are reflected by the fracture. This technique may typically use a single antenna configuration even though a dual antenna configuration is possible.

The pseudo random pulse without carrier signal technique may also be referred to as a spread spectrum ranging technique. This technique may reduce the complexity of processing wideband/short pulse signal by using a sliding correlation principle in the ranging mode. In this example, the continuous wave signal is not used as a carrier. The antenna instead transmits pseudo random number (PN) bipolar digital pulses (i.e., sequences) into the formation/mud. The transmitter emits a signal having a single frequency between approximately 100 MHz to 1 GHz.

A sliding correlator is used in digital circuits to perform a mathematical cross correlation with a local PN at the receiver at (β) Hz which is running slightly slower than transmitting PN sequence at (α) Hz. For example, the transmitting pulse may be a 500 MHz pulse (i.e., 2 nanosecond pulse width) and the local PN may be a 499 MHz signal. The ranging resolution is proportional to the pulse rate (500 MHz). But the processing circuits only operate at the frequency difference which is 1 MHz. This typically consumes less power for sampling and filtering in digital signal processing than other solutions. The time resolution of the ranging is given by $\Delta \tau = 2T_c = 2/R_c$, where $T_c$ is the pulse period and $R_c$ is the pulse rate.

Maximum correlation of the reflected signal gives equivalent time sampling when two sequences are maximally correlated at $\Delta = T_c * \gamma * 1$ where the slide factor $\gamma = \alpha/(\alpha - \beta)$ and the length of sequence, $l = 2^n - 1$ (n is the maximum length of the sequence), the period of the PN sequence=$T_{pn} = T_c * l$, and the actual propagation time, $t_p$=observed time from scope/γ.

In general, propagation using ranging method as discussed in Mode 2A can estimate improved EM contrast from dielectric permittivity at a higher MHz to GHz regime. The tilt orientation of the fracture/thin bed, with respect to the tool, can be estimated by comparing the result of $\Delta = T_c * \gamma * 1$ to the resistivity value determined using Mode 1 (that gave the reference point of the open and closed fracture) and using data fusion. The tilt angle of the formation may be estimated by using a simple geometrical computation relative to ranging data as determined by the operation illustrated in FIG. 2.

The propagation Mode 2B (i.e., attenuation and phase mode) measures the attenuation and phase of the propagating EM signals due to skin effect of the formation at relatively high frequencies (e.g., >10 MHz). FIG. 3 is an example of this propagation mode. A minimum of two antennas are used for receiving and the imaging resolution is primarily determined by the separation of the antennas. Separate antennas are usually used for transmission. Alternatively, one of receive antennas can also be used for transmitting, as shown in FIG. 3. The attenuation and phase shift of signals transmitted from one transmitter to a pair of receivers (i.e. two receivers) may be used to extract the resistivity and/or permittivity of the formation using electromagnetic inversion technique. Additional transmitters at increasing distances from the pair of receivers may be used to provide increasing depth of penetration and distance to the formation.

Mode 2B enables a relative medium depth of investigation (as compared to the other modes) and imaging resolution of a tens of millimeters based on the annular slotted antenna discussed previously. This mode can measure resistivity and/or dielectric constants of reflected EM signals from the sensor but at a coarser resolution and medium distance as compared to the other modes. Signal processing of such propagation tools can be substantially similar to dielectric electromagnetic propagation tools that may operate from 30 MHz to 1 GHz. Imaging data may be processed using predetermined and stored values of formation properties in a look-up table to retrieve the predetermined resistivity and dielectric permittivity profiles for imaging of the geological formation.

Alternatively, an inversion method may be used to extract the coarser resistivity and permittivity imaging profile in Mode 2B. The tilt angle of thin bed or fractures may then be estimated at further standoff with respect to Mode 1 (which gives finer imaging resolution of approximately less than 10 mm) with data fusion.

FIGS. 4-7 are block diagrams showing examples of EM imaging systems, according to various examples of the disclosure. These block diagrams are for purposes of illustration only as other systems may be used to accomplish substantially similar results.

Figure 4:
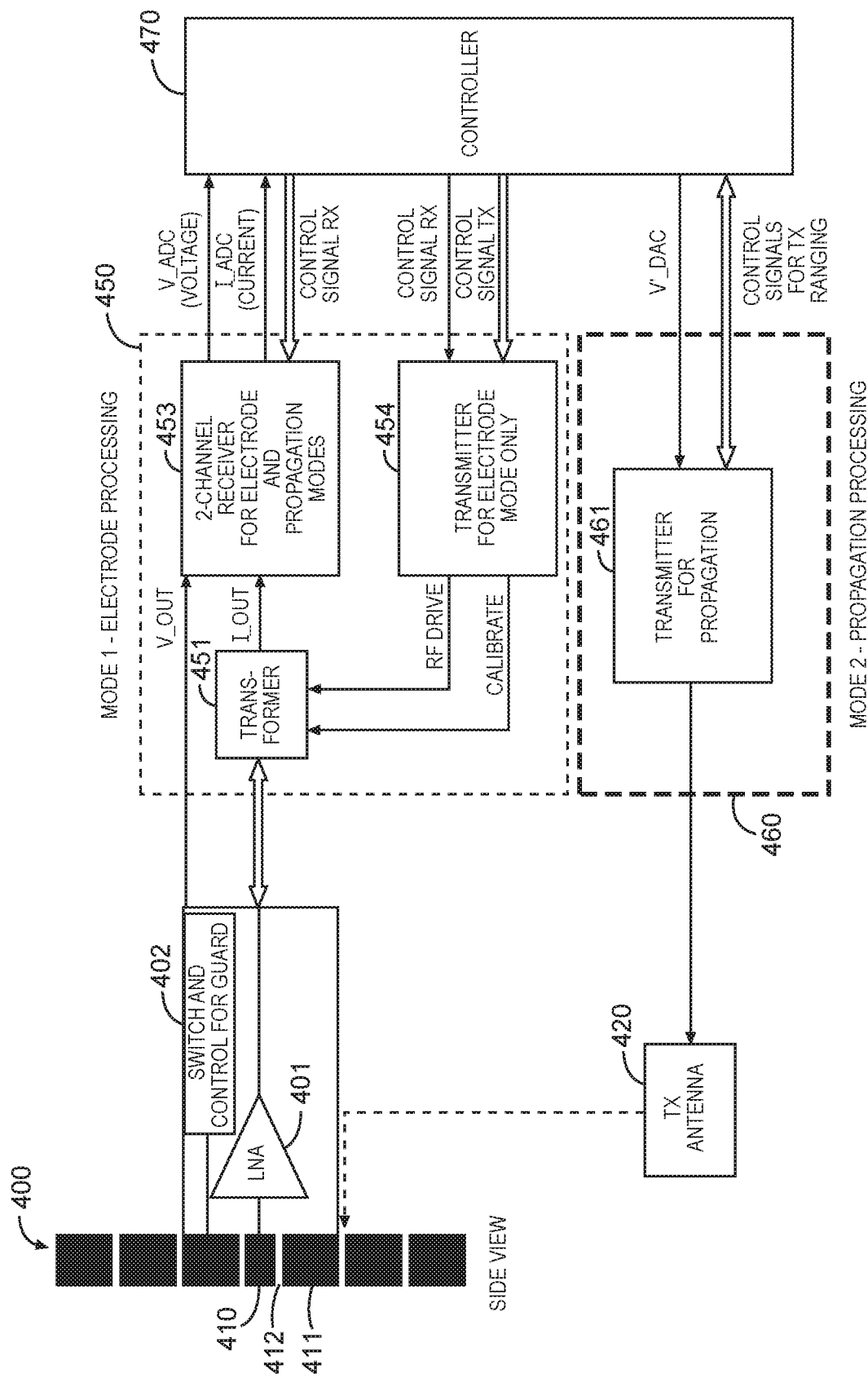
FIGS. 4-7 are block diagrams showing examples of electromagnetic imaging systems, according to various examples of the disclosure.

FIG. 4 is a block diagram showing an example of an EM imaging system. In this example, the center conductor 410 and outer conductor 411 of the EM aperture 400 are shared between button/guard 410, 411 and annular slot antenna 412 for different operational modes (e.g., Mode 1, Mode 2). An optional transmit antenna 420 may be included for transmitting in the propagation mode (i.e., Mode 2).

The EM aperture 400 is shown with the button/center conductor 410 coupled to an input of a low noise amplifier (LNA) 401. The LNA 401 provides amplification of relatively weak, noisy signals received from the formation. A switch 402 is coupled to the outer conductor 411 to provide the ability of coupling different voltages (e.g., 0V) to the outer conductor 411 during different modes of operation.

The output of the LNA 401 is coupled to Mode 1 electrode processing circuitry 450. This circuitry 450 is coupled to a controller (e.g., microprocessor) 470 for controlling the operation of the EM aperture 400 and processing received and transmitted signals.

Similarly, the optional transmit antenna 420, that may be the same as the outer slotted antenna 107 in FIG. 1, may be used for transmission of a signal received from Mode 2 propagation processing circuitry 460. The Mode 2 propagation processing circuitry 460 is coupled to the controller 470 for controlling operation of the transmit antenna 420 and the Mode 2 propagation processing circuitry and processing signals for transmission.

The Mode 1 electrode processing circuitry 450 includes a transformer 451 that interfaces the EM aperture 400 with the circuitry 450. A multiple channel receiver 453 and an electrode mode (i.e., Mode 1) only transmitter 454 are coupled to the transformer. The multiple channel receiver 453 provides signal processing, demodulation, filtering and analog-to-digital conversion of received signals from the transformer. The transmitter 454 provides signal processing, modulation, and digital-to-analog conversion of signals to be transmitted through the transformer 451 to the EM aperture 400. Both the receiver 453 and the transmitter 454 are coupled to the controller 470 for controlling their operation.

The Mode 2 propagation processing circuitry 460 includes a transmitter 461 for the propagation mode only. This transmitter 461 is coupled to the controller 470 in order to receive the signals for transmission. The transmitter 461 provides modulation and digital-to-analog conversion of signals for transmission of signals over the annular slot antenna 512 during any of the Mode 2 modes of operation (e.g., Mode 2A, Mode 2B).

Figure 5:
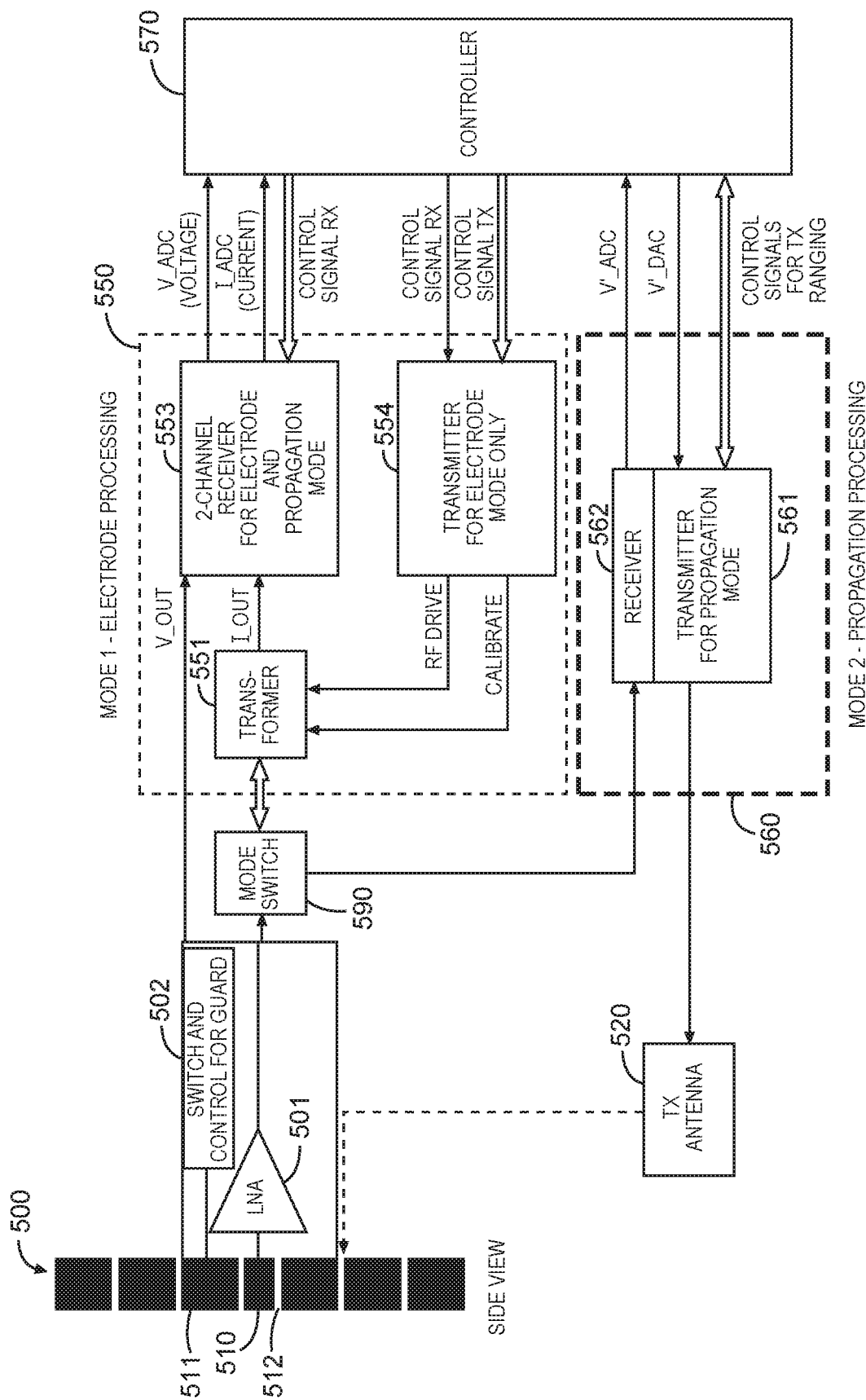

FIG. 5 is a block diagram showing another example of an EM imaging system. In this example, the center conductor 510 and outer conductor 511 of the antenna 500 are shared between button/guard 510, 511 and annular slot antenna 512 for different operational modes (e.g., Mode 1. Mode 2). An optional transmit antenna 520 may be included for transmitting in the propagation mode (i.e., Mode 2). This example includes separate receivers for each mode (i.e., Mode 1, Mode 2) that may improve performance over an example using a shared receiver.

The EM aperture 500 is shown with the button/center conductor 510 coupled to an input of a low noise amplifier (LNA) 501. The LNA 501 provides amplification of relatively weak, noisy signals received from the formation. A switch 502 is coupled to the outer conductor 511 to provide the ability of coupling different voltages (e.g., 0V) to the outer conductor 511 during different modes of operation.

The output of the LNA 501 is coupled to a mode switch 590. The mode switch 590 provides switching between the two receivers 553, 562, depending on the operational mode. Control of this switch may be provided by the controller 570.

The switched outputs of the mode switch 590 are coupled to Mode 1 electrode processing circuitry 550 and Mode 2 propagation processing circuitry 560. These circuits 550, 560 are coupled to the controller (e.g., microprocessor) 570 to enable the controller 570 to provide control of the operation of the antenna 500 and processing received and transmitted signals.

The optional transmit antenna 520, that may be the same as the slotted outer loop antenna 107 in FIG. 1, may be coupled to the annular slot antenna 500 for transmission of a signal received from Mode 2 propagation processing circuitry 560. The Mode 2 propagation processing circuitry 560 is coupled to the controller 570 for controlling operation of the transmit antenna 520 and the Mode 2 propagation processing circuitry and processing signals for transmission.

The Mode 1 electrode processing circuitry 550 includes a transformer 551 that interfaces the EM aperture 500 with the circuitry 550. A multiple channel receiver 553 and an electrode mode (i.e., Mode 1) only transmitter 554 are coupled to the transformer. The multiple channel receiver 553 provides signal processing, demodulation, filtering and analog-to-digital conversion of received signals from the transformer. The transmitter 554 provides signal processing, modulation, and digital-to-analog conversion of signals to be transmitted through the transformer 551 to the antenna 500. Both the receiver 553 and the transmitter 554 are coupled to the controller 570 for controlling their operation.

The Mode 2 propagation processing circuitry 560 includes a transmitter 561 for the propagation mode only. This transmitter 561 is coupled to the controller 570 in order to receive the signals for transmission. The transmitter 561 provides modulation and digital-to-analog conversion of signals for transmission of signals over the annular slot antenna 512 during any of the Mode 2 modes of operation (e.g., Mode 2A, Mode 2B).

The Mode 2 circuitry 560 also includes the second receiver 562 that is dedicated for Mode 2 operation. Thus, the mode switch 590 is switched from coupling signals from the LNA 501 to the Mode 1 electrode processing circuitry 550, during the Mode 1 operation, to coupling signals from the LNA 501 to the dedicated Mode 2 receiver 562 in the Mode 2 propagation processing circuitry 560 during Mode 2 operation.

Figure 6:
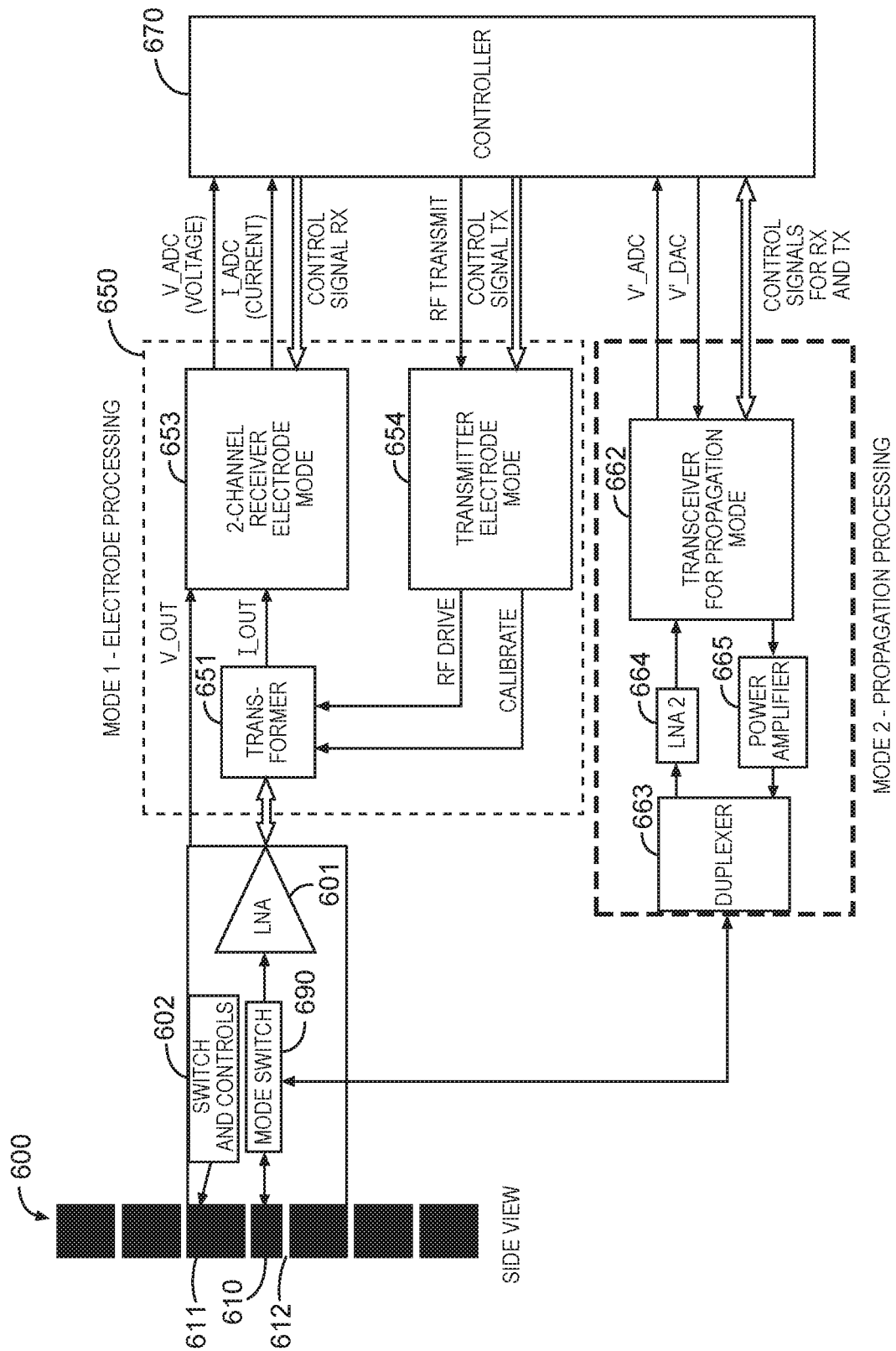

FIG. 6 is a block diagram showing another example of an EM imaging system. In this example, the EM aperture 600 provides a single EM aperture for both Mode 1 button/guard 610, 611 and Mode 2 annular slot antenna 612. The optional transmit antenna of previous examples is not used in this example.

The EM aperture 600 is shown with the button/center conductor 610 coupled to an input of a low noise amplifier (LNA) 601 through a mode switch 690. The LNA 601 provides amplification of relatively weak, noisy signals received from the formation. A switch 602 is coupled to the outer conductor 611 to provide the ability of coupling different voltages (e.g., 0V) to the outer conductor 611 during different modes of operation.

The mode switch 690 switches between the LNA 601 and Mode 1 electrode processing circuitry 650 during the first mode and the Mode 2 propagation processing circuitry 660 during the second mode. Thus, signals from the button 610 are routed to the LNA 601/Mode 1 electrode processing circuitry 650 during Mode 1 operations. Signals are routed between the annular slot antenna 612 and the Mode 2 propagation processing circuitry 660 during Mode 2 operations.

The output of the LNA 601 is coupled to the Mode 1 electrode processing circuitry 650. This circuitry 650 is coupled to a controller (e.g., microprocessor) 670 for controlling the operation of the antenna 600 and processing received and transmitted signals.

The Mode 2 propagation processing circuitry 660 is coupled to the controller 670 for controlling operation of the Mode 2 propagation processing circuitry 660 and processing signals for transmission by the annular slot antenna 612.

The Mode 1 electrode processing circuitry 650 includes a transformer 651 that interfaces the EM aperture 600 with the circuitry 650. A multiple channel receiver 653 and an electrode mode (i.e., Mode 1) only transmitter 654 are coupled to the transformer. The multiple channel receiver 653 provides signal processing, demodulation, filtering and analog-to-digital conversion of received signals from the transformer. The transmitter 654 provides signal processing, modulation, and digital-to-analog conversion of signals to be transmitted through the transformer 651 to the antenna 600. Both the receiver 653 and the transmitter 654 are coupled to the controller 670 for controlling their operation.

The Mode 2 propagation processing circuitry 660 includes a transceiver 662 for the propagation mode only. This transceiver 462 is coupled to the controller 670 in order to receive the signals for transmission. The transceiver 462 provides modulation and digital-to-analog conversion of signals for transmission during any of the Mode 2 modes of operation (e.g., Mode 2A, Mode 2B).

The Mode 2 propagation processing circuitry 660 further includes a power amplifier 665 coupled to an output of the transceiver 662 and a second LNA 664 coupled to an input of the transceiver 662. The power amplifier 665 provides a predetermined gain to any signals to be transmitted from the transceiver 662 over the annular slot antenna 612. The LNA2 664 provides amplification of relatively weak, noisy signals received from the formation during any Mode 2 operation. A duplexer 663 is coupled between the mode switch 690 and both of the LNA2 664 and power amplifier 660 to provide signals to/from these elements 664, 660.

Figure 7:
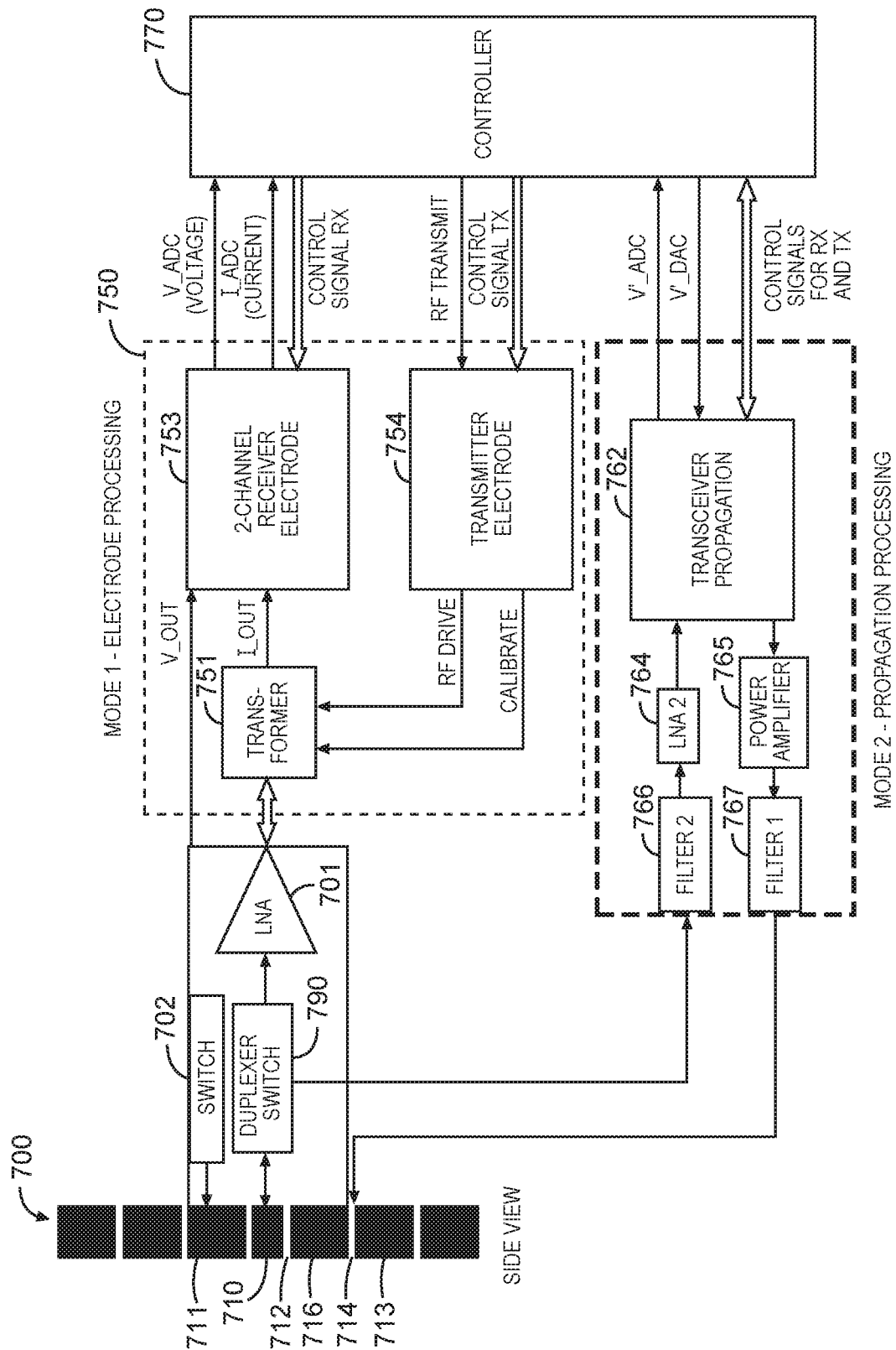

FIG. 7 is a block diagram showing another example of an EM imaging system. In this example, a single EM aperture 700 provides for Mode 1 button/guard 710, 711, a first Mode 2 annular slot antenna 712, and a second, larger Mode 2 annular slot antenna 714. The second, larger annular slot antenna 714, formed by a second outer annular conductor 713 that substantially surrounds the other annular outer conductor 716, may be used as a dedicated transmitting antenna during the Mode 2 propagation modes in this example.

The EM aperture 700 is shown with the button/center conductor 710 coupled to an input of a low noise amplifier (LNA) 701 through a duplexer switch 790. The LNA 701 provides amplification of relatively weak, noisy signals received from the formation. A switch 702 is coupled to the outer conductor 411 to provide the ability of coupling different voltages (e.g., 0V) to the outer conductor 711 during different modes of operation.

The duplexer switch 790 switches between the LNA 701 and Mode 1 electrode processing circuitry 750 during the first mode and the Mode 2 propagation processing circuitry 760 during the second mode. Thus, signals from the button 710 are routed to the LNA 701/Mode 1 electrode processing circuitry 750 during Mode 1 operations. Signals are routed from the first annular slot antenna 712 and the Mode 2 propagation processing circuitry 760 during Mode 2 operations.

The output of the LNA 701 is coupled to Mode 1 electrode processing circuitry 750. This circuitry 750 is coupled to a controller (e.g., microprocessor) 770 for controlling the operation of the antenna 700 and processing received and transmitted signals. The Mode 2 propagation processing circuitry 760 is coupled to the controller 770 for controlling operation of the Mode 2 propagation processing circuitry 760 and processing signals for transmission.

The Mode 1 electrode processing circuitry 750 includes a transformer 751 that interfaces the EM aperture 700 with the circuitry 750. A multiple channel receiver 753 and an electrode mode (i.e., Mode 1) only transmitter 754 are coupled to the transformer. The multiple channel receiver 753 provides signal processing, demodulation, filtering and analog-to-digital conversion of received signals from the transformer. The transmitter 754 provides signal processing, modulation, and digital-to-analog conversion of signals to be transmitted through the transformer 751 to the EM aperture 700. Both the receiver 753 and the transmitter 754 are coupled to the controller 770 for controlling their operation.

The Mode 2 propagation processing circuitry 760 includes a transmitter 761 for the propagation mode only. This transmitter 761 is coupled to the controller 770 in order to receive the signals for transmission. The transmitter 761 provides modulation and digital-to-analog conversion of signals for transmission during any of the Mode 2 modes of operation (e.g., Mode 2A, Mode 2B).

The Mode 2 propagation processing circuitry 660 further includes a power amplifier 765 coupled to an output of the transceiver 762 and a second LNA 764 coupled to an input of the transceiver 762. The power amplifier 765 provides a predetermined gain to any signals to be transmitted from the transceiver 762 through a first filter 767 and over the second, larger annular slot antenna 714. The LNA2 664 provides amplification of relatively weak, noisy signals received from the formation during any of the Mode 2 operations. The received signals for the transceiver 762 are received from the first annular slot antenna 712 through the duplex switch 790 and a second filter 766 before being input to the LNA2 764 and the transceiver 762.

The components of the examples of FIGS. 4-7 are for purposes of illustration only. These examples may have different components to perform substantially the same function. The components may be located in the tool near the antenna or on the surface and coupled to the tool through some form of telemetry.

Figure 8:
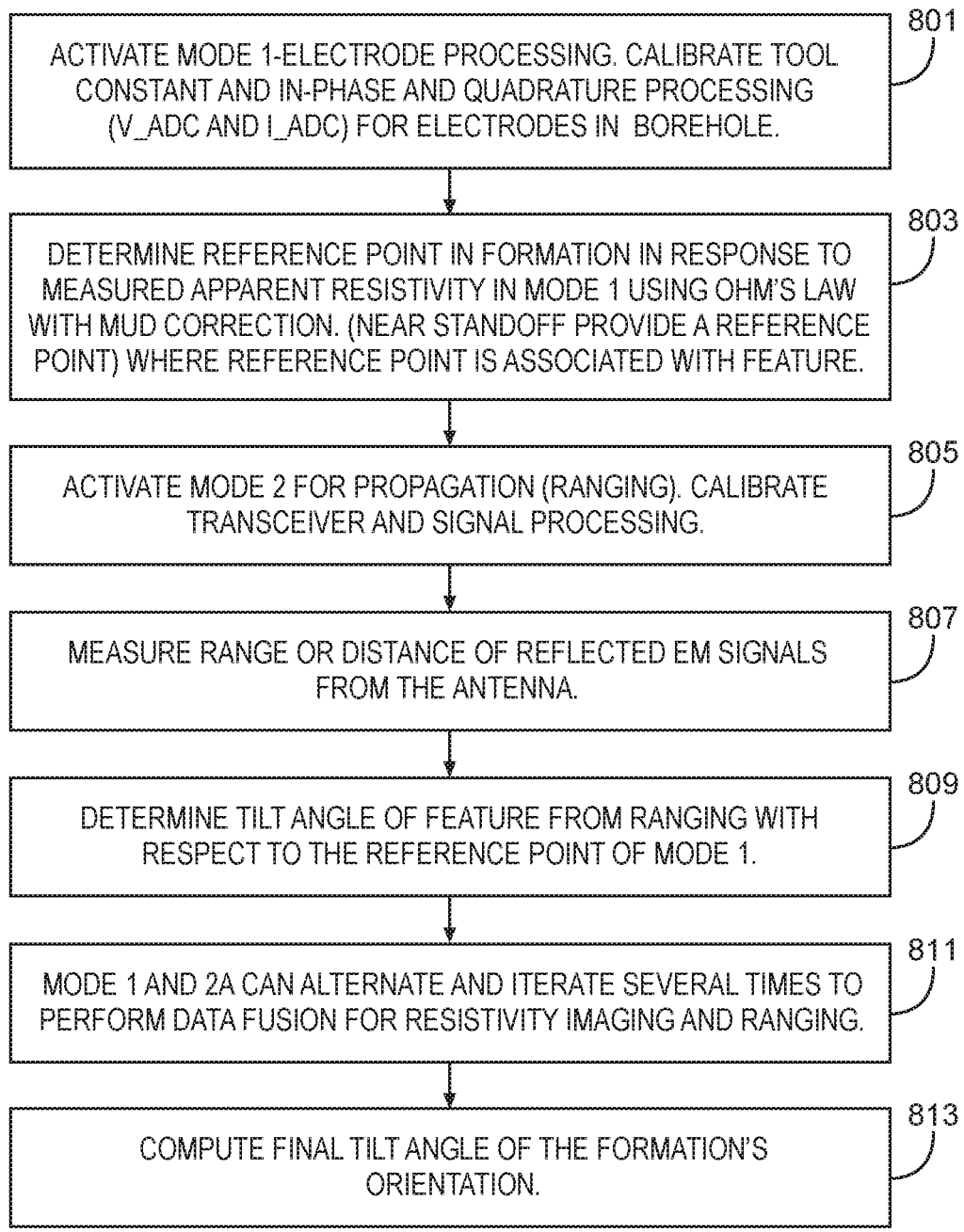
FIG. 8 is a flowchart of a method for geological formation imaging, according to various examples of the disclosure.

FIG. 8 is a flowchart of a method for geological formation imaging, according to various examples of the disclosure. This method may be used during the combination Mode 1 and Mode 2A propagation mode (i.e., ranging mode).

In block 801, the Mode 1 is activated for button and guard electrode processing. A tool constant and in-phase and quadrature processing may be calibrated (e.g., (V_ADC), I_ADC) for the EM button and guard electrode. Analog-to-digital conversion (ADC) here represents analog-to-digital conversion of digitized voltage V and digitized current I.

In block 803, a reference point is determined in a geological formation in response to a resistivity measurement of the formation wherein the reference point is associated with a feature (e.g., fracture) in the formation. This may be accomplished by measuring the apparent resistivity of the immediately adjacent formation using Ohm's law with a stand-off correction (e.g., mud correction). Thus, the resistivity measurement is performed from the button and guard electrode structure of the single electromagnetic aperture antenna structure.

The stand-off correction may be accomplished in various ways. For example, the stand-off can be measured with a different instrument (e.g., an acoustic caliper) or estimated from the imaginary part of apparent resistivity at low frequency. In another example, the relatively thin layer of mud that separates the sensing surface from the borehole wall may be modeled as a series combination of a resistance and a capacitance. The resistance and capacitance of the oil based mud may be measured by the mud cell and corrected.

In block 805, the Mode 2A for propagation is activated. The transceiver and signal processing may be calibrated by (e.g., during an initialization stage with a look-up table) and the switch set such that the reference voltage (e.g., 0V) is coupled to the outer conductor. In block 807, a range to the fracture is measured by reflected EM signals received by the antenna. This ranging operation is performed by transmitting the EM signals from the annular slot antenna of the single EM aperture antenna structure and receiving the EM signals reflected by the formation with the same EM aperture antenna structure. In block 809, a tilt angle of the feature, with respect to the reference point, is determined in response to received electromagnetic signals from the formation.

In block 811, the Mode 1 and Mode 2A may be optionally repeated for a plurality of iterations to perform data fusion for the resistivity imaging of Mode 1 and ranging of Mode 2A. In block 813, a final tilt angle may be determined if the data fusion of the plurality of iterations was performed.

Figure 9:
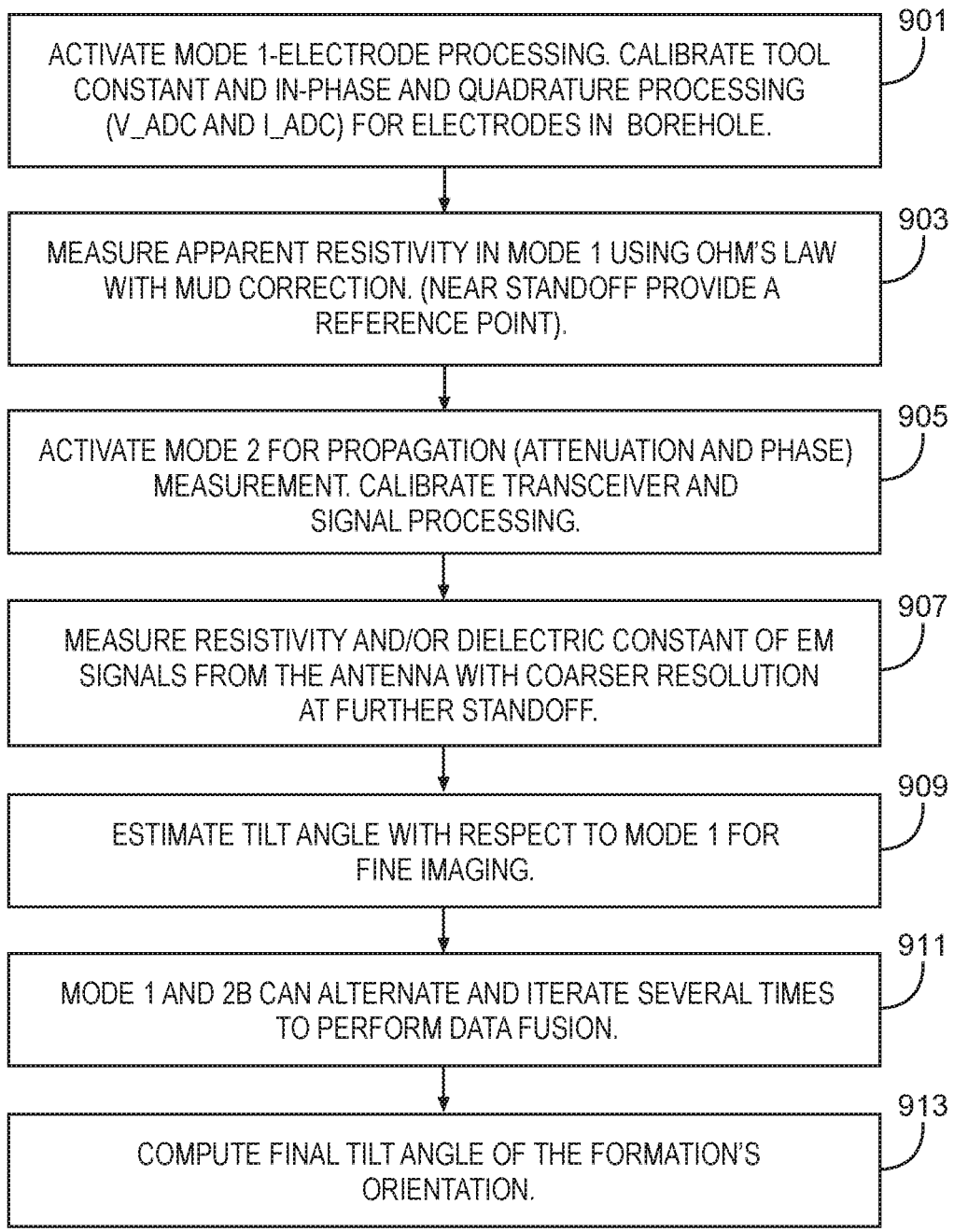
FIG. 9 is a flowchart of another method for geological formation imaging, according to various examples of the disclosure.

FIG. 9 is a flowchart of another method for geological formation imaging, according to various examples of the disclosure. This method may be used during the combination Mode 1 and Mode 2B propagation mode (i.e., attenuation and phase mode).

In block 901, the Mode 1 is activated for button and guard electrode processing. A tool constant and in-phase and quadrature processing may be calibrated (e.g., (V_ADC), I_ADC) for the EM button and guard electrode. Calibration may be done with artificial formation blocks or resistors and capacitance values.

In block 903, a reference point is determined in a geological formation in response to a resistivity measurement of the formation wherein the reference point is associated with a fracture in the formation. This may be accomplished by measuring the apparent resistivity of the immediately adjacent formation using Ohm's law with a stand-off correction (e.g., mud correction).

In block 905, Mode 2 for propagation is activated. The transceiver and signal processing may be calibrated by and the switch set such that the reference voltage (e.g., 0V) is coupled to the outer conductor. In block 907, the resistivity and/or a dielectric constant of the received electromagnetic signals is measured based on based on an attenuation or phase change of the received electromagnetic signals relative to the transmitted electromagnetic signals. The resolution of the measurements may become coarser as the stand-off distance increases.

In block 909, a tilt angle of the fracture, with respect to the reference point, is determined in response to the received electromagnetic signals from the formation. In block 911, the Mode 1 and Mode 2B may be optionally repeated for a plurality of iterations to perform data fusion for the resistivity imaging of Mode 1 and attenuation and phase of Mode 2B. In block 913, a final tilt angle may be determined if the data fusion of the plurality of iterations was performed.

Figure 10B:

FIGS. 10A and 10B are a table showing a comparison of various operational mode characteristics, according to various examples of the disclosure. The table includes a column 1000-1002 for each mode (e.g., Mode 1, Mode 2A, Mode 2B). The rows 1010-1016 of the table disclose the various characteristics for each mode. For example, the rows 1010-1016 comprise: the resolution and function of each mode 1010, a stand-off distance 1011 typically used in each mode between the tool and the borehole wall, a measurement principle 1012 used in each mode, a use of the inner/center conductor of the antenna 1013, a use of the outer conductor of the antenna 1014, a use of an annulus region between the center conductor and outer conductor 1015, and the potential of the tool body in which the antenna is mounted 1016.

Figure 11:
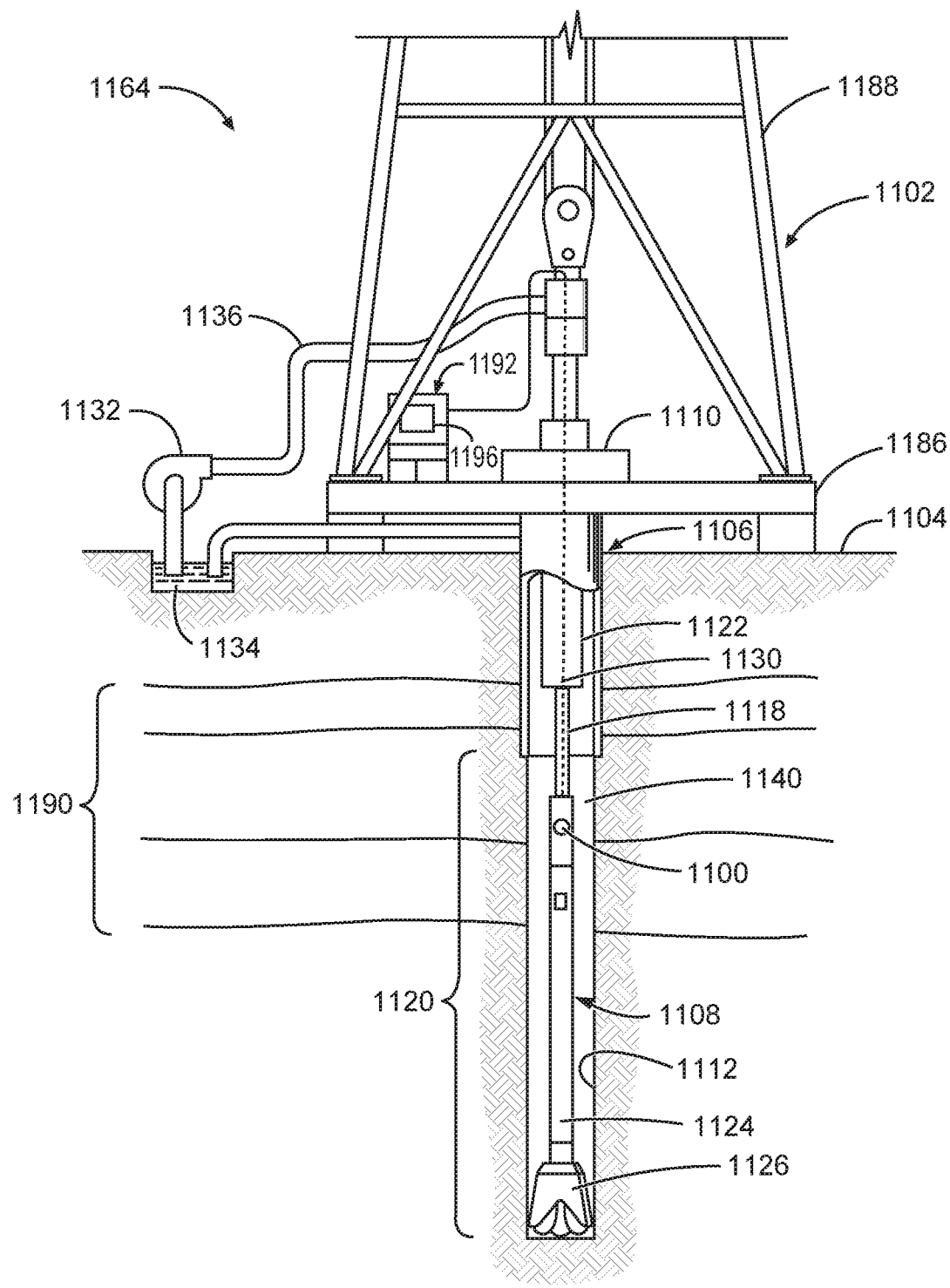
FIG. 11 is a diagram showing a drilling system, according to various examples of the disclosure.

FIG. 11 is a diagram showing a drilling system, according to various embodiments. The system 1164 includes a drilling rig 1102 located at the surface 1104 of a well 1106. The drilling rig 1102 may provide support for a drillstring 1108. The drillstring 1108 may operate to penetrate the rotary table 1110 for drilling the borehole 1112 through the subsurface formations 1190. The drillstring 1108 may include a drill pipe 1118 and the bottom hole assembly (BHA) 1120 (e.g., drill string), perhaps located at the lower portion of the drill pipe 1118.

The BHA 1120 may include drill collars 1122, a downhole tool 1124, stabilizers, sensors, an RSS, a drill bit 1126, as well as other possible components. The drill bit 1126 may operate to create the borehole 1112 by penetrating the surface 1104 and the subsurface formations 1190. The BHA 1120 may further include downhole tool 140 including the single EM aperture antenna structure 1100 examples as described previously.

During drilling operations within the borehole 1112, the drillstring 1108 (perhaps including the drill pipe 1118 and the BHA 1120) may be rotated by the rotary table 1110. Although not shown, in addition to or alternatively, the BHA

1120 may also be rotated by a motor (e.g., a mud motor) that is located downhole. The drill collars 1122 may be used to add weight to the drill bit 1126. The drill collars 1122 may also operate to stiffen the BHA 1120, allowing the BHA 1120 to transfer the added weight to the drill bit 1126, and in turn, to assist the drill bit 1126 in penetrating the surface 1104 and subsurface formations 1190.

During drilling operations, a mud pump 1132 may pump drilling fluid (sometimes known by those of ordinary skill in the art as "drilling mud") from a mud pit 1134 through a hose 1136 into the drill pipe 1118 and down to the drill bit 1126. The drilling fluid can flow out from the drill bit 1126 and be returned to the surface 1104 through an annular area 1140 between the drill pipe 1118 and the sides of the borehole 1112. The drilling fluid may then be returned to the mud pit 1134, where such fluid is filtered. In some examples, the drilling fluid can be used to cool the drill bit 1126, as well as to provide lubrication for the drill bit 1126 during drilling operations. Additionally, the drilling fluid may be used to remove subsurface formation cuttings created by operating the drill bit 1126.

A workstation 1192 including a controller 1196 may include modules comprising hardware circuitry, a processor, and/or memory circuits that may store software program modules and objects, and/or firmware, and combinations thereof that are configured to execute at least the methods of FIGS. 8 and 9. The workstation 1192 may also include modulators and demodulators for modulating and demodulating data transmitted downhole through the cable 1130 or telemetry received through the cable 1130 from the downhole environment. The workstation 1192 and controller 1196 are shown near the rig 1102 only for purposes of illustration as these components may be located at remote locations. The workstation 1192 may include the surface portion of the dual polarization system.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 12:
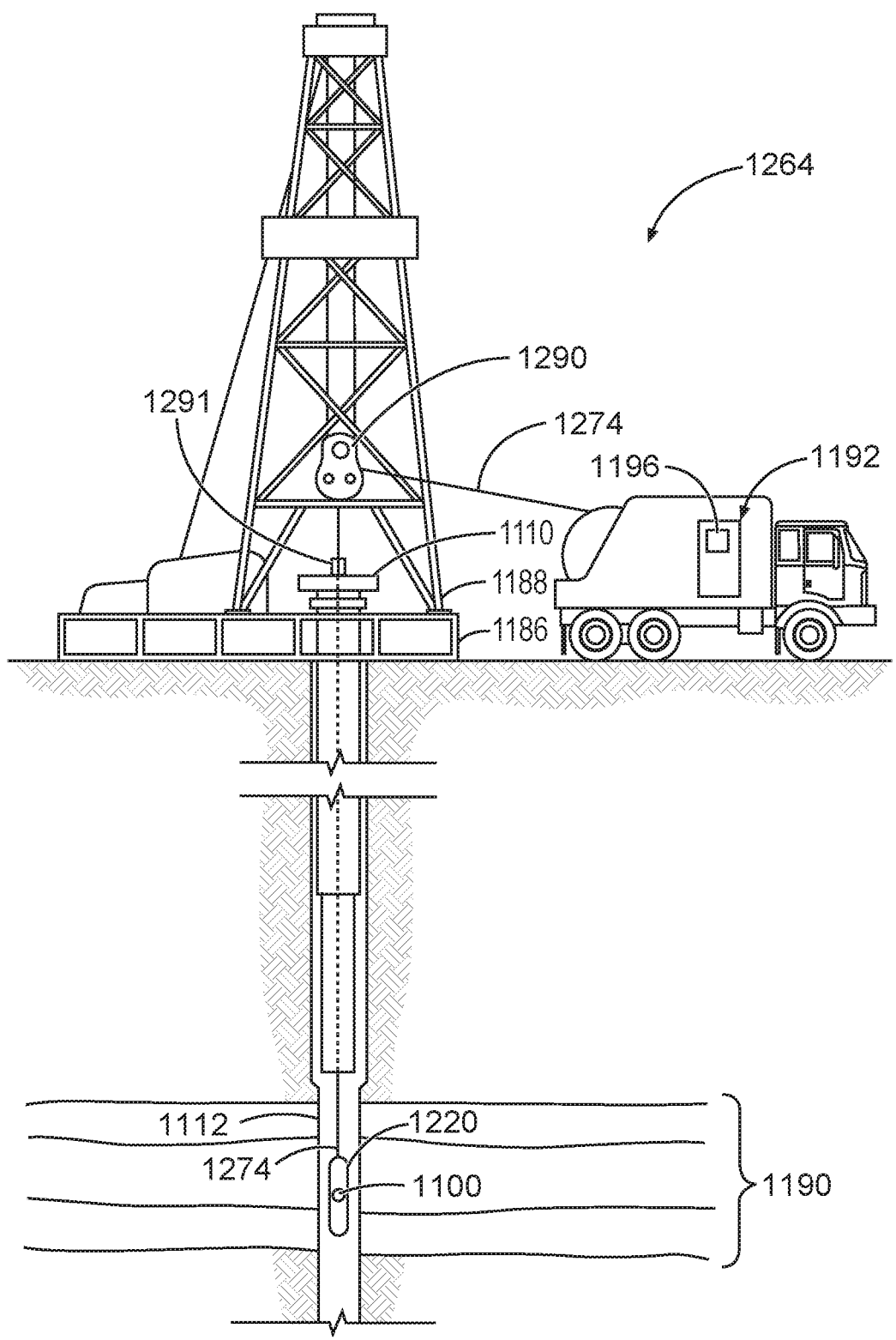
FIG. 12 is a diagram showing a wireline system, according to various examples of the disclosure.

FIG. 12 is a diagram showing a wireline system 1264, according to various examples of the disclosure. The system 1264 may comprise at least one wireline logging tool body 1220, as part of a wireline logging operation in a borehole 1112, including the single EM aperture antenna structures 1100 described previously.

A drilling platform 1186 equipped with a derrick 1188 that supports a hoist 1290 can be seen. Drilling oil and gas wells is commonly carried out using a string of drill pipes connected together so as to form a drillstring that is lowered through a rotary table 1110 into the borehole 1112. Here it is assumed that the drillstring has been temporarily removed from the borehole 1112 to allow the wireline logging tool body 1220, such as a probe or sonde with the single EM aperture antenna structure 1100, to be lowered by wireline or logging cable 1274 (e.g., slickline cable) into the borehole 1112. Typically, the wireline logging tool body 1220 is lowered to the bottom of the region of interest and subsequently pulled upward at a substantially constant speed.

During the upward trip, at a series of depths, the tool with the single EM aperture antenna structure 1100 may be used to image the formation and determine a tilt angle for formation fractures. The resulting data may be communicated to a surface logging facility (e.g., workstation 1192) for processing, analysis, and/or storage. The workstation 1192 may have a controller 1196 that is able to execute any methods disclosed herein.

Figure 13:
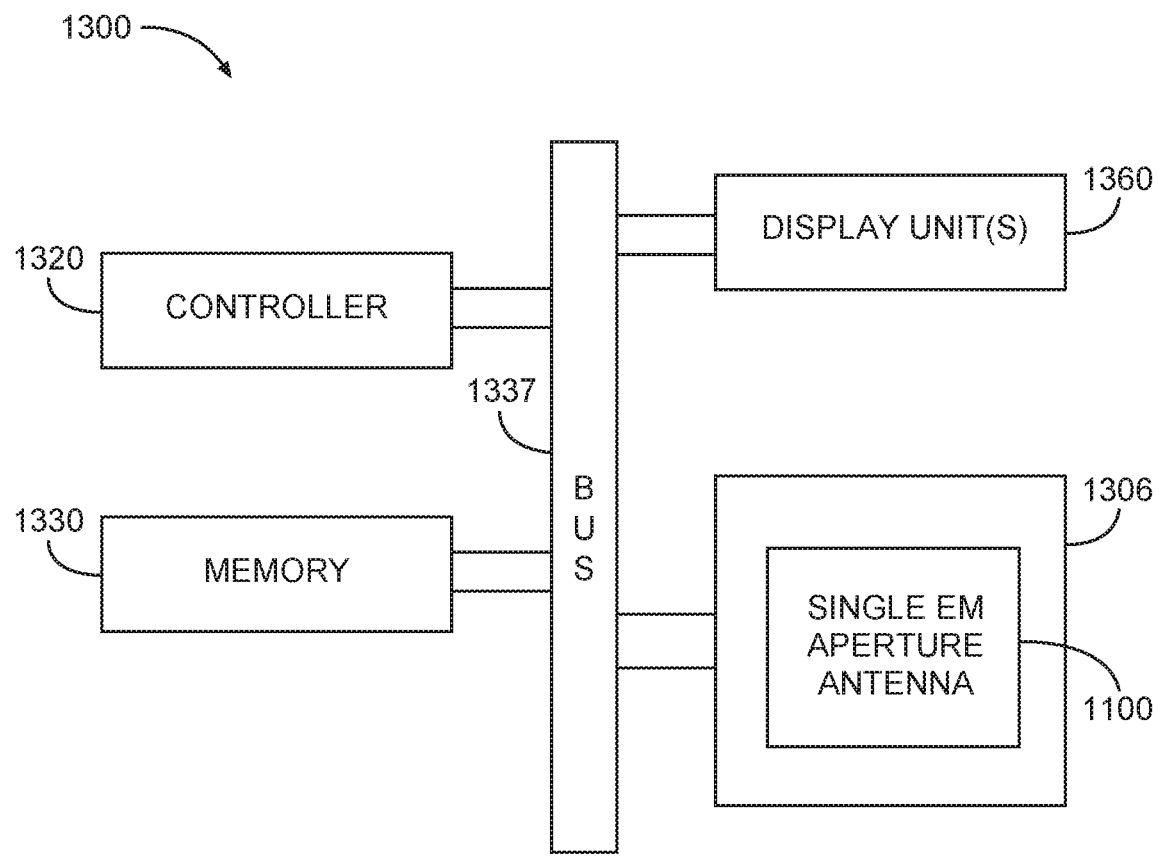
FIG. 13 is a block diagram of an example system operable to implement the activities of multiple methods, according to various examples of the disclosure.

FIG. 13 is a block diagram of an example system 1300 operable to implement the activities of multiple methods, according to various examples of the disclosure. The system 1300 may include a tool housing 1306 having the single EM aperture antenna structure 1100 disposed therein. The system 1300 may be implemented as shown in FIGS. 11 and 12 with reference to the workstation 1192 and controller 1196.

The system 1300 may include a controller 1320, a memory 1330, and a communications unit 1335. The memory 1330 may be structured to include a database. The controller 1320, the memory 1330, and the communications unit 1335 may be arranged to operate as a processing unit to control operation of the single EM aperture antenna structure 1100 and execute any methods disclosed herein in order to determine the condition of borehole pipes.

The communications unit 1335 may include communications capability for communicating from downhole to the surface or from the surface to downhole. Such communications capability can include a telemetry system such as mud pulse telemetry. In another example, the communications unit 1335 may use combinations of wired communication technologies and wireless technologies.

The system 1300 may also include a bus 1337 that provides electrical conductivity among the components of the system 1300. The bus 1337 can include an address bus, a data bus, and a control bus, each independently configured or in an integrated format. The bus 1337 may be realized using a number of different communication mediums that allows for the distribution of components of the system 1300. The bus 1337 may include a network. Use of the bus 1337 may be regulated by the controller 1320.

The system 1300 may include display unit(s) 1360 as a distributed component on the surface of a wellbore, which may be used with instructions stored in the memory 1330 to implement a user interface to monitor the operation of the tool 1306 or components distributed within the system 1300. The user interface may be used to input parameter values for thresholds such that the system 1300 can operate autonomously substantially without user intervention in a variety of applications. The user interface may also provide for manual override and change of control of the system 1300 to a user. Such a user interface may be operated in conjunction with the communications unit 1335 and the bus 1337.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Example 1 is a method comprising: determining a reference point in a geological formation in response to a resistivity measurement of the formation wherein the reference point is associated with a feature in the formation; and determining a tilt angle of the feature, with respect to the reference point, in response to received electromagnetic signals from the formation.

In Example 2, the subject matter of Example 1 can optionally include correcting the reference point based on a stand-off distance between an antenna and a borehole wall.

In Example 3, the subject matter of Examples 1-2 can optionally include performing the resistivity measurement from a button and guard electrode structure of an electromagnetic aperture antenna structure; transmitting electromagnetic signals from an annular slot antenna of the electromagnetic aperture antenna structure; and receiving the received electromagnetic signals from the formation with the electromagnetic aperture antenna structure.

In Example 4, the subject matter of Examples 1-3 can optionally include wherein determining the tilt angle of the feature comprises performing a ranging operation on the received electromagnetic signals by frequency modulated continuous wave, short pulse with pulse repetition, or spread spectrum ranging.

In Example 5, the subject matter of Examples 1-4 can optionally include wherein determining the tilt angle of the feature comprises measuring a resistivity and/or a dielectric constant of the received electromagnetic signals based on an attenuation or phase change of the received electromagnetic signals relative to the transmitted electromagnetic signals.

In Example 6, the subject matter of Examples 1-5 can optionally include imaging the feature based on predetermined resistivity and dielectric permittivity profiles for the geological formation.

In Example 7, the subject matter of Examples 1-6 can optionally include wherein determining the tilt angle comprises determining a time-of-flight of the received electromagnetic signals based on a transmission time of corresponding electromagnetic signals.

In Example 8, the subject matter of Examples 1-7 can optionally include wherein determining the reference point in the geological formation in response to the resistivity measurement comprises: applying a voltage to a center electrode and an annular, outer electrode, separated from the center electrode by a dielectric, of a single electromagnetic aperture electromagnetic antenna coupled to a tool body; maintaining an equipotential between the center electrode and the outer electrode; measuring a current returning to the tool body; and determining the resistivity in response to Ra=K(V/I) where Ra is the apparent resistivity of the formation, K is a geometric factor, V is a magnitude of a voltage, and I is the current returning to the tool body.

In Example 9, the subject matter of Examples 1-8 can optionally include wherein determining the tilt angle of the feature comprises: applying the voltage to the center electrode; and applying a second voltage to the annular, outer electrode.

In Example 10, the subject matter of Examples 1-9 can optionally include wherein applying the second voltage comprises applying approximately AC ground to the annular, outer electrode.

Example 11 is an apparatus comprising: a center conductor; an annular outer conductor surrounding the center conductor and separated from the center conductor by a dielectric; and a switch coupled to the outer conductor and configured to couple a first voltage to the outer conductor during a first mode of operation and a second voltage to the outer conductor during a second mode of operation; wherein the center conductor and outer conductor act as a button and guard electrode during the first mode of operation and an annular slot antenna during the second mode of operation.

In Example 12, the subject matter of Example 11 can optionally include wherein the center conductor is coupled to the first voltage during the first mode of operation and the outer conductor is coupled to a reference voltage during the second mode of operation.

In Example 13, the subject matter of Examples 11-12 can optionally include a tool body in which the apparatus is disposed such that the outer conductor is separated from the tool body by a second dielectric, wherein the tool body is configured to be coupled to the reference voltage during the first mode of operation.

In Example 14, the subject matter of Examples 11-13 can optionally include wherein the center conductor is configured to transmit a current during the first mode of operation and the tool body is configured to receive the current during the first mode of operation.

Example 15 is a system comprising: a tool having an electromagnetic (EM) aperture, the EM aperture comprising: a center conductor; an annular outer conductor surrounding the center conductor and separated from the center conductor by a first dielectric, the annular outer conductor separated from a tool housing by a second dielectric; and a switch coupled to the outer conductor and configured to couple a first voltage to the outer conductor during a first mode of operation and a reference voltage to the outer conductor during a second mode of operation; wherein the center conductor and outer conductor are configured to be a button and guard electrode during the first mode of operation and an annular slot antenna during the second mode of operation; and circuitry coupled to the EM aperture, the circuitry configured to control transmission of a current from the button into a formation, measure a resistivity of the formation in response to a current received by the tool body, determine a reference point of a feature in the formation based on the resistivity of the formation, and perform a propagation measurement of the feature relative to the reference point to determine a tilt angle of the feature.

In Example 16, the subject matter of Example 15 can optionally include wherein the imaging tool is disposed in a wireline tool or a drillstring.

In Example 17, the subject matter of Examples 15-16 can optionally include a second EM aperture coupled to the tool, the second EM aperture configured to transmit only during the second mode of operation.

In Example 18, the subject matter of Examples 15-17 can optionally include wherein the aperture further comprises a second annular outer conductor that substantially surrounds the annular outer conductor and separated from the annular outer conductor by a second dielectric, the annular outer conductor and the second annular outer conductor forming a second annular slot antenna in the EM aperture.

In Example 19, the subject matter of Examples 15-18 can optionally include wherein the circuitry further comprises: electrode processing circuitry coupled to the center conductor, the electrode processing circuitry comprising: a multi-channel receiver coupled to the center conductor through a transformer; and a first transmitter coupled to the center conductor through the transformer; propagation processing circuitry coupled to the annular slot antenna, the propagation processing circuitry comprising a transmitter; and a controller coupled to the electrode processing circuitry and the propagation processing circuitry and configured to control operation of the electrode processing circuitry and the propagation processing circuitry.

In Example 20, the subject matter of Examples 15-19 can optionally include wherein the propagation processing circuitry further comprises a receiver coupled to the center conductor through a mode switch.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. A method comprising:
   measuring a resistivity of a geological formation using a first mode of operation of an electromagnetic resistivity sensor, wherein the first mode of operation comprises applying a first voltage to a center electrode and an annular, outer electrode of the electromagnetic resistivity sensor;
   determining a reference point in the geological formation in response to the resistivity measurement of the formation, wherein the reference point is associated with a feature in the formation;
   transmitting electromagnetic signals to the formation using a second mode of operation of the electromagnetic resistivity sensor, wherein the second mode of operation operates at a higher frequency than the first mode of operation, and wherein the second mode of operation comprises applying the first voltage to the center electrode and a second voltage to the outer electrode; and
   determining a tilt angle of the feature, with respect to the reference point, in response to receiving the electromagnetic signals reflected from the formation.

2. The method of claim 1, further comprising correcting the reference point based on a stand-off distance between an antenna and a borehole wall.

3. The method of claim 1, further comprising:
   measuring the resistivity using a button and guard electrode structure of an electromagnetic aperture antenna structure of the electromagnetic resistivity sensor;
   transmitting the electromagnetic signals from an annular slot antenna of the electromagnetic aperture antenna structure; and
   receiving the received electromagnetic signals reflected from the formation with the electromagnetic aperture antenna structure.

4. The method of claim 3, wherein determining the tilt angle of the feature comprises performing a ranging operation on the received electromagnetic signals by frequency modulated continuous wave, short pulse with pulse repetition, or spread spectrum ranging.

5. The method of claim 3, wherein determining the tilt angle of the feature comprises measuring a resistivity and/or a dielectric constant of the received electromagnetic signals based on an attenuation or phase change of the received electromagnetic signals relative to the transmitted electromagnetic signals.

6. The method of claim 1, further comprising imaging the feature based on predetermined resistivity and dielectric permittivity profiles for the geological formation.

7. The method of claim 1, wherein determining the tilt angle comprises determining a time-of-flight of the received electromagnetic signals based on a transmission time of corresponding electromagnetic signals.

8. The method of claim 1, wherein determining the reference point in the geological formation in response to the resistivity measurement comprises:
   applying a voltage to the center electrode and the annular, outer electrode, separated from the center electrode by a dielectric, of a single electromagnetic aperture electromagnetic antenna coupled to a tool body;
   maintaining an equipotential between the center electrode and the outer electrode;
   measuring a current returning to the tool body; and
   determining the resistivity in response to $R_a = K(V/I)$ where $R_a$ is the apparent resistivity of the formation, K is a geometric factor, V is a magnitude of a voltage, and I is the current returning to the tool body.

9. The method of claim 8, wherein determining the tilt angle of the feature comprises:
   applying the voltage to the center electrode; and
   applying a second voltage to the annular, outer electrode.

10. The method of claim 9, wherein applying the second voltage comprises applying approximately AC ground to the annular, outer electrode.

11. An apparatus comprising:
    a center conductor;
    an annular outer conductor surrounding the center conductor and separated from the center conductor by a dielectric; and
    a switch coupled to the outer conductor and configured to couple a first voltage to the outer conductor during a first mode of operation and a second voltage to the outer conductor during a second mode of operation;
    wherein the center conductor and outer conductor act as a button and guard electrode during the first mode of operation and an annular slot antenna during the second mode of operation.

12. The apparatus of claim 11, wherein the center conductor is coupled to the first voltage during the first mode of operation and the outer conductor is coupled to a reference voltage during the second mode of operation.

13. The apparatus of claim 12, further comprising a tool body in which the apparatus is disposed such that the outer conductor is separated from the tool body by a second dielectric, wherein the tool body is configured to be coupled to the reference voltage during the first mode of operation.

14. The apparatus of claim 13, wherein the center conductor is configured to transmit a current during the first mode of operation and the tool body is configured to receive the current during the first mode of operation.

15. A system comprising:
    a tool having an electromagnetic (EM) aperture, the EM aperture comprising:
    a center conductor;
    an annular outer conductor surrounding the center conductor and separated from the center conductor by a first dielectric, the annular outer conductor separated from a tool housing by a second dielectric; and
    a switch coupled to the outer conductor and configured to couple a first voltage to the outer conductor during a first mode of operation and a reference voltage to the outer conductor during a second mode of operation;
    wherein the center conductor and outer conductor are configured to be a button and guard electrode during the first mode of operation and an annular slot antenna during the second mode of operation; and circuitry coupled to the EM aperture, the circuitry configured to control transmission of a current from the button into a formation, measure a resistivity of the formation in response to a current received by the tool body, determine a reference point of a feature in the formation based on the resistivity of the formation, and perform a propagation measurement of the feature relative to the reference point to determine a tilt angle of the feature.

16. The system of claim 15, wherein the imaging tool is disposed in a wireline tool or a drillstring.

17. The system of claim 15, further comprising a second EM aperture coupled to the tool, the second EM aperture configured to transmit only during the second mode of operation.

18. The system of claim 15, wherein the aperture further comprises a second annular outer conductor that substantially surrounds the annular outer conductor and separated from the annular outer conductor by a second dielectric, the annular outer conductor and the second annular outer conductor forming a second annular slot antenna in the EM aperture.

19. The system of claim 15, wherein the circuitry further comprises:

electrode processing circuitry coupled to the center conductor, the electrode processing circuitry comprising:

a multi-channel receiver coupled to the center conductor through a transformer; and a first transmitter coupled to the center conductor through the transformer;

propagation processing circuitry coupled to the annular slot antenna, the propagation processing circuitry comprising a transmitter; and a controller coupled to the electrode processing circuitry and the propagation processing circuitry and configured to control operation of the electrode processing circuitry and the propagation processing circuitry.

20. The system of claim 19, wherein the propagation processing circuitry further comprises a receiver coupled to the center conductor through a mode switch.

* * * * *